J. W. LAMBERT.
FRICTION DRIVING MECHANISM.
APPLICATION FILED JAN. 7, 1909.

954,977.

Patented Apr. 12, 1910.

WITNESSES:
W. M. Gentle.
O. M. McLaughlin

INVENTOR.
John W. Lambert.
BY
T. H. Lockwood
ATTORNEY.

UNITED STATES PATENT OFFICE.

JOHN W. LAMBERT, OF ANDERSON, INDIANA.

FRICTION DRIVING MECHANISM.

954,977.  Specification of Letters Patent.  Patented Apr. 12, 1910.

Application filed January 7, 1909. Serial No. 471,055.

*To all whom it may concern:*

Be it known that I, JOHN W. LAMBERT, of Anderson, county of Madison, and State of Indiana, have invented a certain new and useful Friction Driving Mechanism; and I do hereby declare that the following is a full, clear, and exact description thereof, reference being had to the accompanying drawings, in which like numerals refer to like parts.

The object of this invention is to improve the construction and mode of operation of friction drive mechanism for automobiles and the like. In such device there is a friction driving disk and a friction driven disk coöperating. The driven disk is mounted on a shaft that is driven by the fly wheel of the engine or other driving means. Said driving disk must be moved toward and away from the driven disk, and therefore the shaft of the driving disk must be longitudinally movable.

The invention relates to the connection between the fly wheel of the engine and shaft of the driving friction disk, whereby such longitudinal movement of said shaft is permitted with the least play and waste of power and with a most efficient transmission of power from the fly wheel to the shaft of the driving disk. To that end pins project rigidly from the side of the fly wheel through the arms of a spider secured on the shaft of the driving disk, and the arrangement is such that said spider can slide longitudinally on said pins and with perfect freedom and yet there will be no play or looseness in the connection so far as the longitudinal movements of the parts are concerned.

Figure 1:
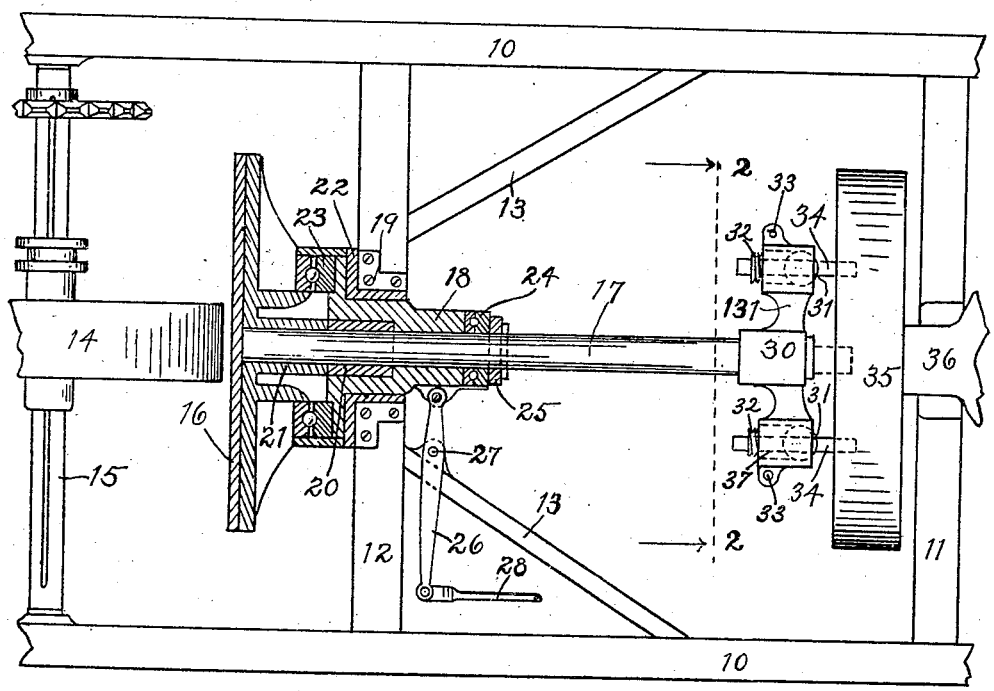
Figure 2:
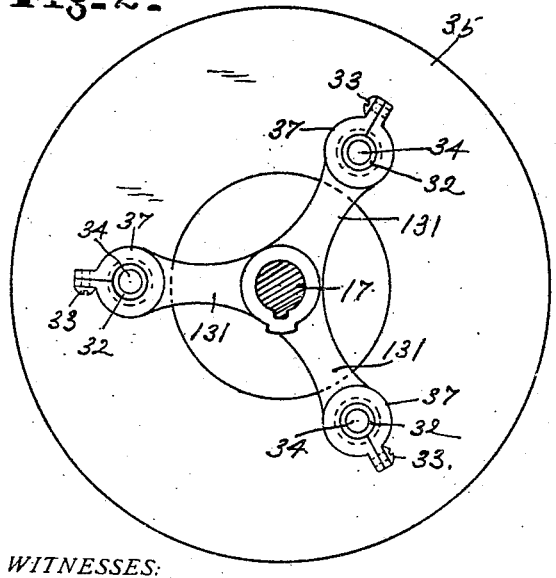
Figure 3:
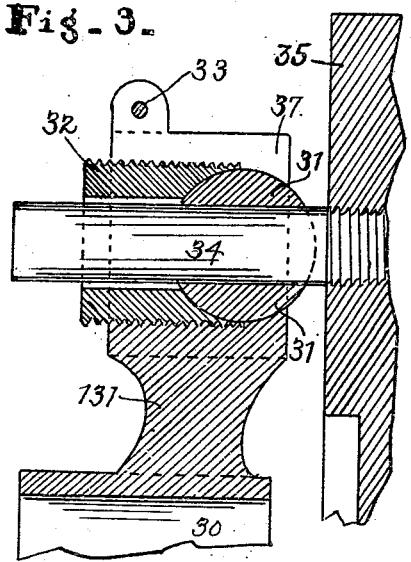

The nature of this invention will be understood from the accompanying drawings and the following description and claims:

Figure 1. is a plan view of a portion of the chassis of an automobile, parts being in horizontal section and parts broken away. Fig. 2. is a section on the line 2—2 of Fig. 1, showing the fly wheel of the engine in side elevation. Fig. 3. is a longitudinal section through the connection between the fly wheel of the engine and the shaft of the driving friction disk, parts being broken away.

In detail the parts 10, 11, 12 and 13 constitute the frame of the device. There is a driven disk 14 mounted transversely slidable on a shaft 15. A driving disk 16 co-operates with the driven disk 14, the disk 16 being arranged transversely of the device and secured on a shaft 17 mounted in bearings on the frame piece 12. The shaft has a sliding bearing 18 in a fixed bearing 19 secured to the bar 12. The rear half of the sliding bar 18 is enlarged to receive the sleeve 20, that at its front end abuts against a shoulder in the bearing 18 and that its rear end fits against a sleeve 21 from the driving disk 16. The enlarged end of the bearing 20 has a radial flange 22 and between that flange and the disk 16 there is a ball bearing 23 to resist end thrusts. There is also a ball bearing 24 at the other end of the bearing 18 held in place by the collar 25 on the shaft 17. The bearing 18 has no rotary movement, but is capable of longitudinal movement in the bearing 19. The shaft 17 is moved longitudinally by the lever 26 fulcrumed at 27 to one of the brace bars 13. The inner end of the lever is partly connected with the sleeve 18 so as to slide said sleeve and shaft 17 longitudinally when said lever is operated from the front part of the car through the connecting rod 28.

Coming now to the feature that constitutes the invention herein, it is observed that the shaft 17 has secured on it a spider 30 with radial arms 31 having their outer ends split and bored out parallel with the shaft 17 so as to receive the ball 31 and tubular plug 32 that holds the ball in place. The split parts of the end of the arm 31 are clamped together by the bolt 33 after the plug 32 has been put in place. The ball 31 is radially apertured to receive the pin 34 that extends from the side of the fly wheel 35, which is mounted in connection with the engine frame 36, only a portion of which is shown. The ball 31 fits snugly, but loosely enough on the pin 34 so that the ball can turn on a pin if necessary. The ball also can turn somewhat in its bearing. To hold the ball in place one end of the aperture through the arm 31 is contracted to form an annular shoulder 37, the inner surface of which is spherically disposed so as to furnish a seat for the ball, and the inner end of the plug or sleeve 32 is likewise spherically disposed to furnish a curved bearing surface for the ball 31. The sleeve or nut 32 is cored out large enough not to touch pin 34 and is screwed up against the ball tightly enough to hold it in place and yet permit it to have necessary play. Hence, the pin 34 has bearing only in the ball and the ball has bearing in the seat formed by the shoulder 37 and plug 32.

In operation it is observed that power is transmitted directly from the engine to the shaft 17 without any intermediate part yielding or having much play in operation. The ball may possibly turn at times very slightly, but the snug fit between it and the pin and between the ball and the spider permit power to be transmitted with the same efficiency as through a solid shaft. And yet the longitudinal movement of the shaft is in no wise hindered but is perfectly free, and the balls adjust themselves to all conditions of operation.

What I claim as my invention and desire to secure by Letters Patent is:

1. Power transmission mechanism including a power transmitting wheel, rigid pins projecting from the side thereof parallel with the axis of the wheel; a longitudinally movable shaft independent of and coaxial with said wheel, rigid arms projecting radially from said shaft near said wheel and provided with ball sockets, balls fitting in said sockets so as to be slidable on said pins, and means insertible in each socket for tightening the ball therein, whereby said shaft may have longitudinal movement and the parts have no angular play.

2. Friction power transmission mechanism including a power transmitting wheel, a longitudinally movable shaft independent of and coaxial with said wheel, rigid pins projecting from the side of said wheel, rigid arms extending radially from said shaft near said wheel with their outer ends apertured and split, one end of the apertured portion of each arm being contracted and having a concave bearing surface, a ball adapted to fit in the aperture of each arm against said bearing surface and surrounding said pin so as to be slidable thereon, a tubular plug screwed into each arm with a concave bearing surface on the inner end to engage said ball, and means for clamping the split end of each arm.

In witness whereof, I have hereunto affixed my signature in the presence of the witnesses herein named.

JOHN W. LAMBERT.

Witnesses:
JOHN W. GRAY,
GLAD. S. KING.